United States Patent [19]

Akiyama

[11] Patent Number: 4,941,556

[45] Date of Patent: Jul. 17, 1990

[54] ELECTRONICALLY-CONTROLLED FUEL INJECTION SYSTEM FOR INTERNAL COMBUSTION ENGINES

[75] Inventor: Eitetsu Akiyama, Wako, Japan

[73] Assignee: Honda Giken Kogyo K.K., Tokyo, Japan

[21] Appl. No.: 416,517

[22] Filed: Oct. 3, 1989

[30] Foreign Application Priority Data

Oct. 12, 1988 [JP] Japan ................................ 63-256472

[51] Int. Cl.[5] ........................ F16D 43/00; B60K 20/00

[52] U.S. Cl. .................................. 192/0.062; 74/858; 74/872

[58] Field of Search ............... 192/0.062; 74/858, 872, 74/878

[56] References Cited

U.S. PATENT DOCUMENTS

| | | | |
|---|---|---|---|
| 4,353,272 | 10/1982 | Schneider et al. | 74/872 |
| 4,493,228 | 1/1985 | Vukovich et al. | 74/858 |
| 4,548,181 | 10/1985 | Ishikawa et al. | 123/492 |
| 4,590,564 | 5/1986 | Ishikawa et al. | 123/493 |
| 4,677,880 | 7/1987 | Hattori et al . | 74/858 |
| 4,700,590 | 10/1987 | Omitsu | 74/872 |
| 4,803,898 | 2/1989 | Hibino et al. | 74/872 |

FOREIGN PATENT DOCUMENTS 603458 6/1983 Japan .

*Primary Examiner*—Leslie A. Braun
*Assistant Examiner*—Nicholas Whitelaw
*Attorney, Agent, or Firm*—Arthur L. Lessler

[57] ABSTRACT

An electronically-controlled fuel injection system for internal combustion engines. When the engine is in an accelerating condition, an amount of fuel supplied to the engine is increased by means of an incremental value. It is discriminated whether or not a predetermined time period has elapsed from the time the rotational speed of the engine increased above a predetermined value, or from the time gear shifting was completed, while the engine is in the accelerating condition. The incremental value is limited to a predetermined upper limit if the former exceeds the latter before the lapse of the predetermined time period, whereby sudden increase in the engine rotational speed can be prevented.

5 Claims, 6 Drawing Sheets

FIG. 2
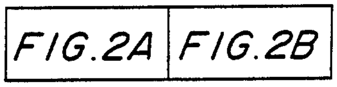
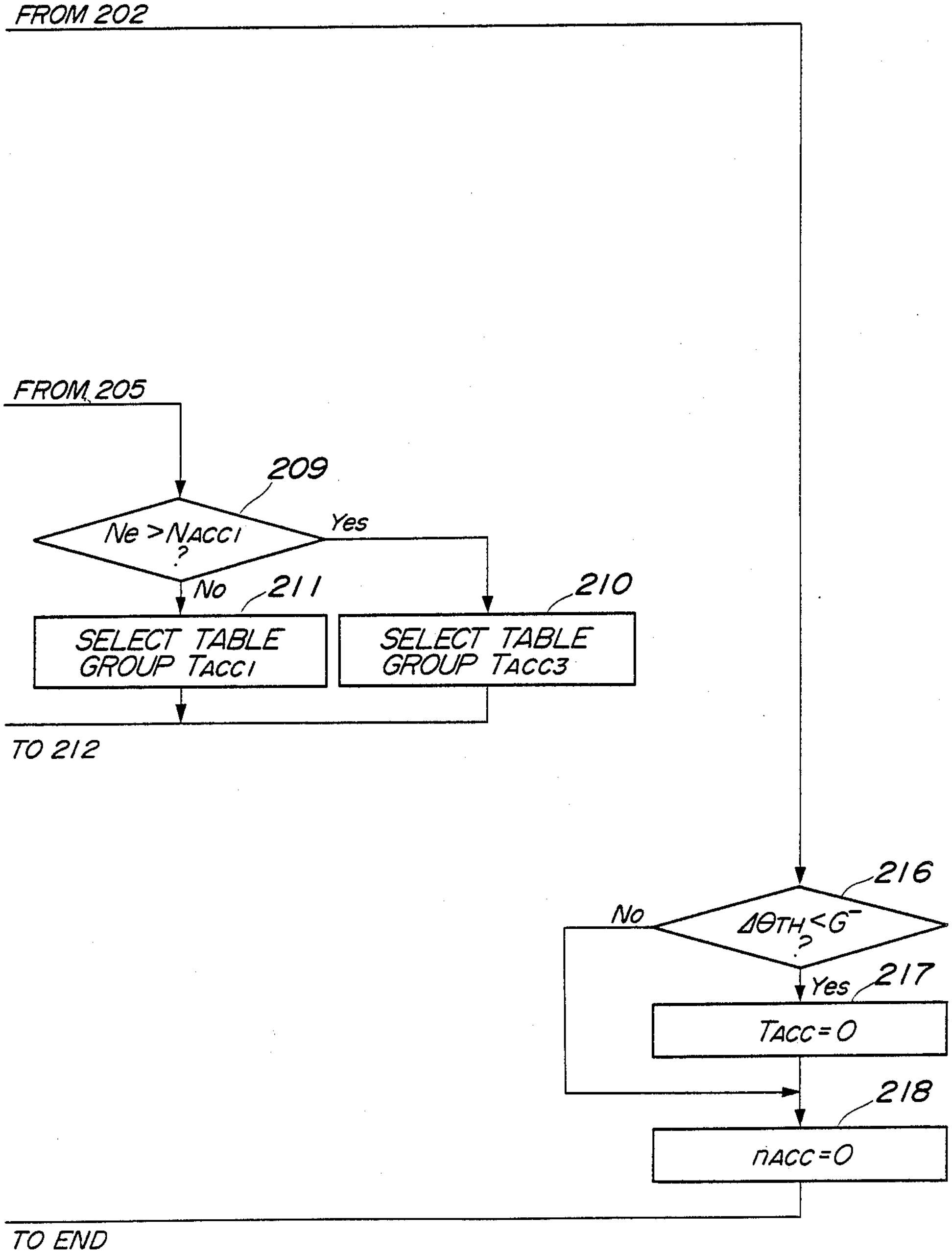
FIG. 2B

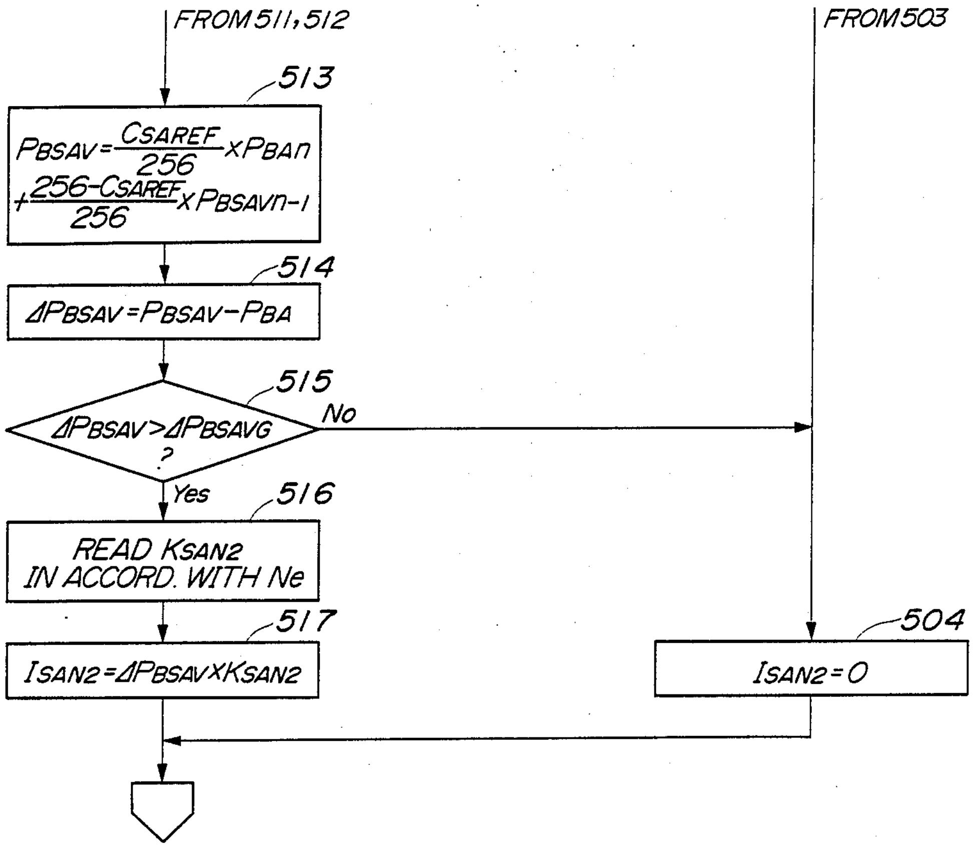
FIG. 5B
FIG. 5
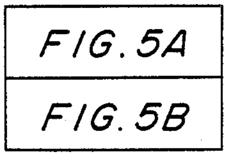

ELECTRONICALLY-CONTROLLED FUEL INJECTION SYSTEM FOR INTERNAL COMBUSTION ENGINES

BACKGROUND OF THE INVENTION

This invention relates to an electronically-controlled fuel injection system for internal combustion engines, and more particularly to a system of this kind which is intended to improve the driveability of the engine when the engine is in a transient state such as acceleration.

Conventionally, there have been proposed various methods of electronically controlling fuel injection into internal combustion engines in transient states, e.g. by Japanese Provisional Patent Publication (Kokai) No. 60-3458 which is adapted to increase the amount of fuel injected into the engine when the engine is in an accelerating condition, in order to improve the accelerability.

According to the method proposed by Publication No. 60-3458, an accelerating condition of the engine is detected from a rate of change in the opening degree of a throttle valve, i.e. from a rate of depression of the accelerator pedal, and the amount of fuel supplied to the engine is increased based on the detected accelerating condition.

However, the proposed method has the disadvantage that there is a possibility of occurrence of a sudden change in the engine output torque when the engine is in a particular operating condition, which results in vibration of the vehicle body and hence degraded accelerability of the engine.

Specifically, according to the proposed method, an accelerating fuel increment is set to a value appropriate to an engine condition in which the clutch is in an engaged state, i.e., the engine is connected to the transmission. However, when gear shifting is carried out during acceleration of the engine by first disengaging the clutch while closing the throttle valve, shifting gears, and then engaging the clutch while opening the throttle valve, the amount of fuel supplied to the engine is increased based on the change rate in the throttle valve opening degree i.e. the rate of depression of the accelerator pedal. As a result, the engine output torque is excessively increased upon engagement of the clutch, thereby resulting in vibration of the vehicle body and hence degraded accelerability.

SUMMARY OF THE INVENTION

It is the object of the invention to provide an electronically-controlled fuel injection system which is capable of preventing sudden increase in the engine output torque when gear shifting is carried out during acceleration of the engine, thereby preventing vibration of the vehicle body.

According to a first aspect of the invention, there is provided an electronically-controlled fuel injection system for an internal combustion engine, having acceleration determining means for determining whether or not the engine is in an accelerating condition, and accelerating fuel increasing means for increasing an amount of fuel supplied to the engine by means of an incremental value when the acceleration determining means determines that the engine is in the accelerating condition.

The first aspect of the invention is characterized by an improvement comprising:

rotational speed detecting means for detecting whether or not the rotational speed of the engine exceeds a predetermined value while the acceleration determining means determines that the engine is in the accelerating condition;

time period discriminating means for discriminating whether or not a predetermined time period has elapsed from the time the rotational speed detecting means detected that the rotational speed of the engine increased above the predetermined value; and incremental value limiting means for limiting the incremental value to a predetermined upper limit value if the former exceeds the latter before the time period discriminating means discriminates that the predetermined time period has elapsed.

According to a second aspect of the invention, there is provided an electronically-controlled fuel injection system for an internal combustion engine having power transmission means, the system having acceleration determining means for determining whether or not the engine is in an accelerating condition, and accelerating fuel increasing means for increasing an amount of fuel supplied to the engine by means of an incremental value when the acceleration determining means determines that the engine is in the accelerating condition.

The second aspect of the invention is characterized by an improvement comprising:

after-shifting discriminating means for discriminating whether or not a predetermined time period has elapsed from the time gear shifting of the power transmission means was completed while the acceleration determining means determines that the engine is in the accelerating condition; and incremental value limiting means for limiting the incremental value to a predetermined upper limit value if the former exceeds the latter before the after-shifting discriminating means discriminates that the predetermined time period has elapsed.

According to a third aspect of the invention, there is provided an electronically-controlled fuel injection system for an internal combustion engine having acceleration determining means for determining whether or not the engine is in an accelerating condition, and accelerating fuel increasing means for increasing an amount of fuel supplied to the engine by means of an incremental value when the acceleration determining means determines that the engine is in the accelerating condition.

The third aspect of the invention is characterized by an improvement comprising:

rotational speed detecting means for detecting whether or not the rotational speed of the engine exceeds a predetermined value while the acceleration determining means determines that the engine is in the accelerating condition;

time period discriminating means for discriminating whether or not a predetermined time period has elapsed from the time the rotational speed detecting means detected that the rotational speed of the engine increased above the predetermined value; and after-shifting discriminating means for discriminating whether or not the predetermined time period has elapsed from the time gear shifting of the power transmission means was completed while the acceleration determining means determines that the engine is in the accelerating condition; and incremental value limiting means for limiting the incremental value to a predetermined upper limit value if the former exceeds the latter before one of the time period discriminating means and the after-shifting discriminating means discriminates that the predetermined time period has elapsed.

The above and other objects, features, and advantages of the invention will become more apparent from the ensuing detailed description taken in conjunction with the accompanying drawings.

DETAILED DESCRIPTION

The invention will now be described in detail with reference to the drawings showing an embodiment thereof.

Figure 1:
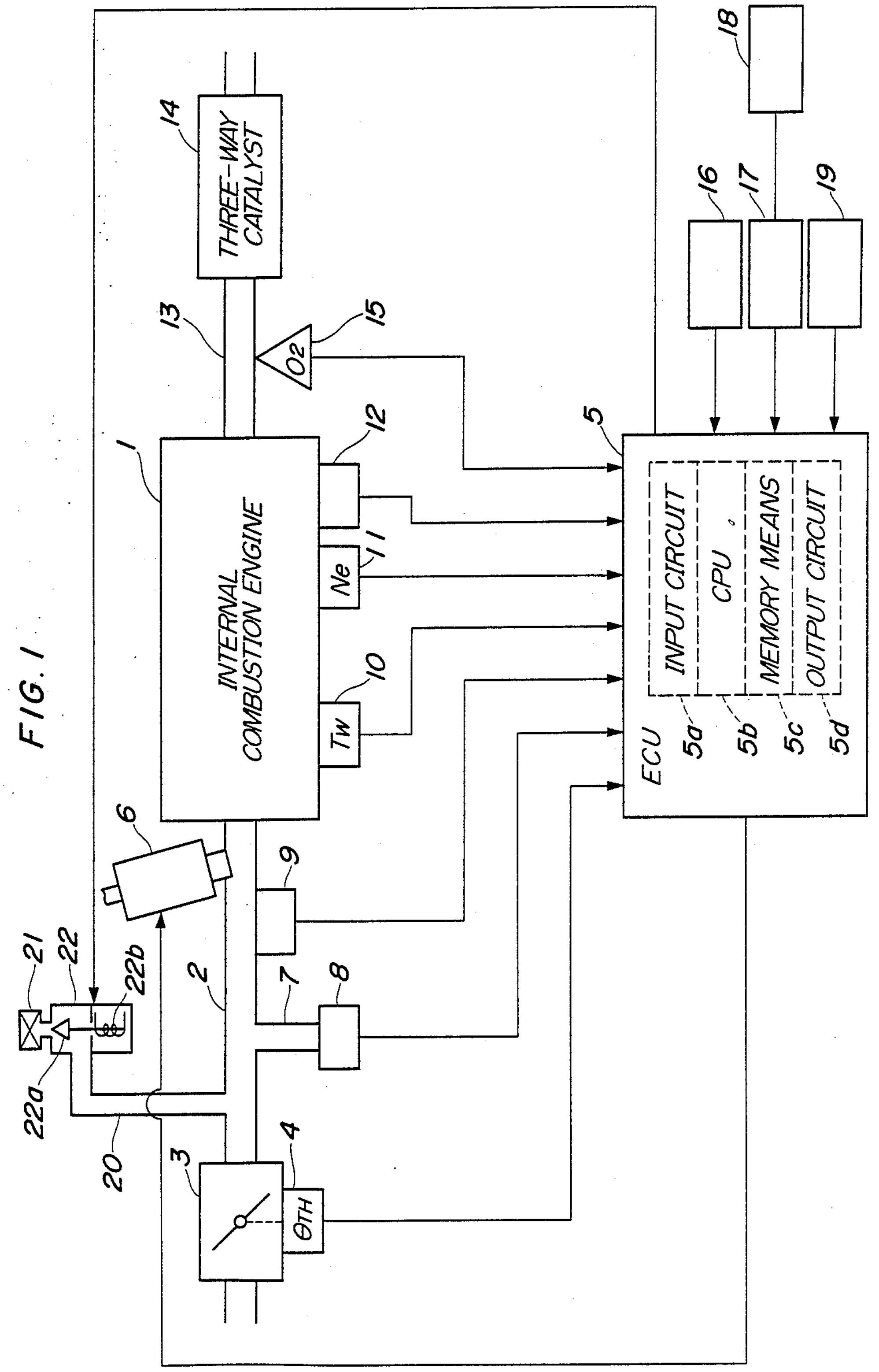
FIG. 1 is a block diagram showing the whole arrangement of an electronically-controlled fuel injection system for an internal combustion engine according to one embodiment of the invention.

Referring first to FIG. 1, there is illustrated the whole arrangement of an electronically-controlled fuel injection system for an internal combustion engine according to an embodiment of the invention. In the figure, reference numeral 1 designates an internal combustion engine, which may be a four-cylinder type, for example, and to which are connected an intake pipe 2 having a throttle valve 3 arranged therein. Connected to the throttle valve 3 is a throttle valve opening ($\theta_{TH}$) sensor 4 which converts the sensed throttle valve opening into an electric signal and supplying same to an electronic control unit (hereinafter referred to as "the ECU") 5.

An air passage (secondary air passage) 20 is connected to the intake pipe 2 at a location downstream of the throttle valve 3, and communicates the interior of the intake pipe 2 with the atmosphere. The air passage 20 has an air cleaner 21 mounted on one end thereof opening into the atmosphere. An auxiliary air amount control valve 22 is arranged across the air passage 20. The auxiliary air amount control valve 22 is a normally closed type proportional electromagnetic valve which comprises a valve body 22*a*, disposed to vary the opening area of the air passage 20 in a continuous manner, a spring, not shown, urging the valve body 22*a* in a direction of closing the valve 22, and a solenoid 22*b* for moving the valve body 22*a* against the force of the spring in a direction of opening the valve 22 when energized. The amount of current supplied to the solenoid 22*b* of the control valve 22 is controlled by the ECU 5 such that the air passage 20 has an opening area conforming to operating conditions of the engine and load on the engine.

Fuel injection valves 6, only one of which is shown, are inserted into the interior of the intake pipe 2 at locations between the cylinder block of the engine 1 and the throttle valve 3 and slightly upstream of respective intake valves, not shown, of respective cylinders. The fuel injection valves 6, which are connected to a fuel pump, not shown, are electrically connected to the ECU 5 to have their valve opening periods controlled by signals therefrom.

An absolute pressure ($P_{BA}$) sensor 8 for detecting absolute pressure $P_{BA}$ within the intake pipe 2 is connected through a pipe 7 to the interior of the intake pipe 2 at a location immediately downstream of the throttle valve 3. The $P_{BA}$ sensor 8 supplies an electric signal indicative of the detected absolute pressure $P_{BA}$ to the ECU 5. An intake air temperature ($T_A$) sensor 9 is mounted in the intake pipe 2 at a location between the pipe 7 and the fuel injection valves 6 for detecting intake air temperature $T_A$ and supplying an electric signal indicative of the detected intake air temperature to the ECU 5.

An engine coolant temperature ($T_W$) sensor 10, which may be formed of a thermistor or the like, is mounted in the cylinder block of the engine 1 in a manner embedded in the peripheral wall of an engine cylinder having its interior filled with coolant, to detect engine coolant temperature $T_W$ and supply an electric signal indicative of the detected engine coolant temperature to the ECU 5. An engine rotational speed (Ne) sensor 11 as well as an engine cylinder-discrimination sensor 12 are arranged in facing relation to a camshaft, not shown, of the engine 1, or a crankshaft, not shown, of same. The engine rotational speed (Ne) sensor 11 generates a pulse (hereinafter referred to as "TDC signal pulse") at a predetermined crank angle position before a top dead center (TDC) at the start of suction stroke of each cylinder, whenever the engine crankshaft rotates through 180 degrees, and supplies the TDC signal pulse to the ECU 5.

A three-way catalyst 14 is arranged in an exhaust pipe 13 extending from the cylinder block of the engine 1 for purifying ingredients HC, CO, NOx, etc. contained in exhaust gases. An $O_2$ sensor 15 is inserted in the exhaust pipe 13 at a location upstream of the three-way catalyst 14 for detecting the concentration of oxygen ($O_2$) in the exhaust gases and supplying an electric signal indicative of the detected oxygen concentration to the ECU 5. Electrically connected to the ECU 5 is a vehicle speed ($V_H$) sensor 16 for detecting the vehicle speed $V_H$, which supplies a signal indicative of the vehicle speed to the ECU 5.

A clutch switch (CLSW) 17 is electrically connected to the ECU 5 for detecting whether a clutch 18 forming part of an engine power transmission system is in an engaged (ON) state wherein the engine output shaft is connected to a transmission, not shown, or in a disengaged (OFF) state wherein the engine output shaft is disconnected from the transmission, and supplying an electric signal indicative of the ON or OFF state of the clutch 18 to the ECU 5. Further electrically connected to the ECU 5 is a switch 19, which indicates whether the transmission is a manual type or an automatic type, for supplying an electric signal indicative of the type of the transmission to the ECU 5.

The ECU 5 comprises an input circuit 5*a* having the functions of shaping the waveforms of input signals from various sensors and switches, shifting the voltage levels of sensor output signals to a predetermined level, converting analog signals from analog-output sensors to digital signals, and so forth, a central processing unit (hereinafter referred to as "the CPU") 5*b*, memory means 5*c* storing various operational programs which are executed in the CPU 5*b* and for storing results of calculations therefrom, etc., and an output circuit 5d which outputs driving signals to the fuel injection valves 6 and the auxiliary air amount control valve 22.

Stored into the memory means 5d are maps and tables including a map of basic fuel injection period Ti, hereinafter referred to, as well as a plurality of groups of tables $T_{ACC}$ of accelerating fuel increment, data values such as an upper limit value $T_{ACLMO}$ for a correction variable $T_{ACC}$.

In this embodiment, the ECU 5 constitutes acceleration determining means, accelerating fuel increasing means, rotational speed detecting means, time period discriminating means, incremental value limiting means, after-shifting discriminating means, and control amount determining means.

The ECU 5 operates in response to the aforementioned engine parameter signals from the various sensors to determine operating conditions of the engine such as a fuel cut condition, an accelerating condition, and a decelerating condition, and calculates a fuel injection period $T_{OUT}$, over which the fuel injection valve 6 should be opened, based on the determined engine operating conditions in synchronism with TDC signal pulses, by the use of the following equation (1):

$$T_{OUT}=Ti\times K_1+T_{ACC}\times K_2+K_3 \quad (1)$$

where Ti represents a basic value of the fuel injection period of the fuel injection valves 6, which is determined as a function of the intake pipe absolute pressure $P_{BA}$ and the engine rotational speed Ne, for example.

$T_{ACC}$ represents an accelerating fuel increment correction variable, which is determined by a subroutine, hereinafter described with reference to FIG. 2. $K_1$, $K_2$, and $K_3$ are correction coefficients and correction variables, respectively, which are calculated based upon values of engine operation parameter signals from various sensors mentioned before so as to optimize operating characteristics of the engine such as startability, emission characteristics, fuel consumption, and accelerability.

The ECU 5 operates based on the fuel injection period $T_{OUT}$ determined as above to supply corresponding driving signals to the fuel injection valves 6 to drive same.

Further, the CPU 5b operates in response to engine parameter signals from various sensors to calculate an electric current amount $I_{SAN2}$ supplied to the solenoid 22b of the auxiliary air amount control valve 22 based on a control program, hereinafter described, and supplies the auxiliary air amount control valve 22 with a driving signal corresponding to the calculated electric current amount via the output circuit 5d to drive the same valve 22.

Figure 2A:
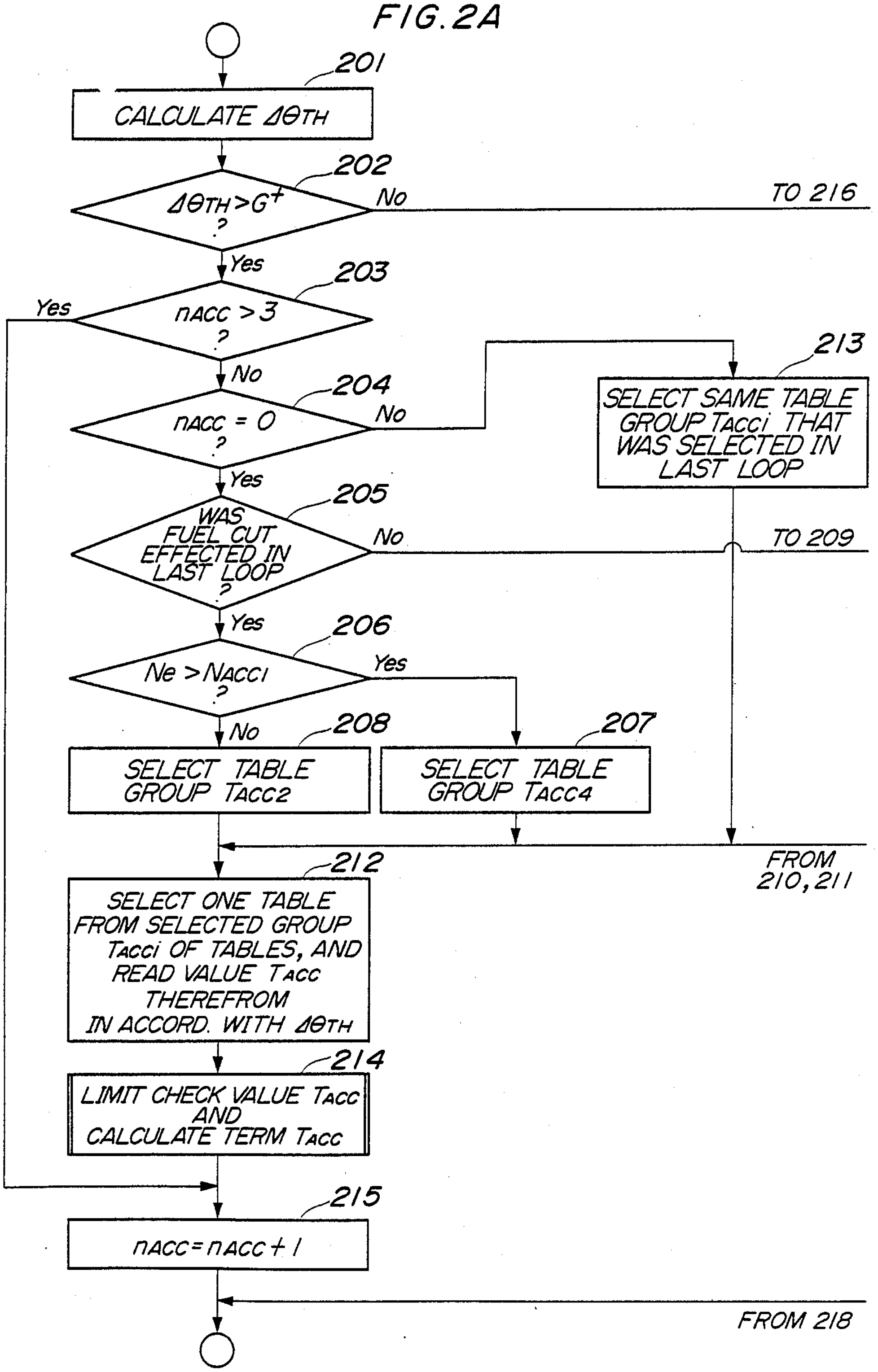
FIG. 2 is a flowchart of a program for determining an accelerating fuel increment correction variable $T_{ACC}$.

FIG. 2 shows a control program for determining a value of the correction variable $T_{ACC}$, which is executed upon generation of each TDC signal pulse and in synchronism therewith.

First, calculated is a rate of change $\Delta\theta_{TH}$ in the opening degree $\theta_{TH}$ of the throttle valve 3 shown in FIG. 1 at a step 201. That is, the change rate $\Delta\theta_{TH}$ is calculated as the difference $\Delta\theta_{THn}$ $(=\theta_{THn}-\theta_{THn-1})$ between an opening degree $\theta_{THn}$ detected in the present loop (i.e. upon generation of the present TDC signal pulse) and an opening degree $\theta_{THn-1}$ detected in the last loop (i.e. upon generation of the immediately preceding TDC signal pulse).

Then, it is determined at a step 202 whether or not the change rate $\Delta\theta_{TH}$ is larger than a predetermined acceleration discriminating value $G^+$ (e.g. +0.4 degrees/TDC signal pulse). If the answer is affirmative or Yes, that is, if $\Delta\theta_{TH}>G^+$ holds and accordingly it is judged that the engine is in the accelerating condition, the program proceeds to a step 203, wherein it is determined whether or not a control variable $\eta_{ACC}$ is larger than 3.

The control variable $\eta_{ACC}$ is increased by 1 at a step 215, hereinafter referred to, each time a TDC signal pulse is generated after the engine has entered the accelerating condition. That is, the step 203 is for determining whether or not a predetermined time period has elapsed, which corresponds to 4 TDC signal pulses in the present embodiment, over which accelerating fuel increase is carried out after the engine has entered the accelerating condition.

If the answer to the question of the step 203 is negative or No, that is, if the value of the control variable $\eta_{ACC}$ assumes one of integers from 1 to 3, the program proceeds to a step 204, wherein it is determined whether or not the value of the control variable $\eta_{ACC}$ is equal to 0.

If the answer to the question of the step 204 is affirmative or Yes, that is, if the engine is in the accelerating condition and wherein the value of the control variable $\eta_{ACC}$ is equal to 0, it is judged that the present TDC signal pulse is the first pulse generated after the engine has entered the accelerating condition. On this occasion, the program proceeds to steps 205 to 211, wherein one group of tables $T_{ACC}$, which correspond to the accelerating condition which the engine entered in the last loop, are selected depending upon whether or not the engine was in the fuel cut condition in the last loop, and whether or not the engine rotational speed Ne in the present loop is higher than a predetermined value.

Specifically, it is first determined at the step 205 whether or not the engine was in the fuel cut condition in the last loop. If the answer is affirmative or Yes, the program proceeds to the step 206, wherein it is determined whether or not the engine rotational speed Ne in the present loop is higher than the predetermined value $N_{ACC1}$, e.g. 1,500 rpm.

If the answer to the question of the step 206 is affirmative or Yes, that is, if the engine was in the fuel cut condition in the last loop and at the same time $Ne>N_{ACC1}$ holds in the present loop, the program proceeds to a step 207, wherein a fourth group $T_{ACC4}$ of tables are selected. On the other hand, if the answer is negative or No, that is, if the engine was in the fuel cut condition and $Ne\leqq N_{ACC1}$ holds, the program proceeds to the step 208, wherein a second group $T_{ACC2}$ of tables are selected.

If the answer to the question of the step 205 is negative or No, that is, if the engine was not in the fuel cut condition, the program proceeds to the step 209, wherein it is determined whether or not the engine rotational speed Ne in the present loop is higher than the predetermined value $N_{ACC1}$, similarly to the step 206.

If the answer to the question of the step 209 is affirmative or Yes, that is, if the engine was not in the fuel cut condition and wherein $Ne>N_{ACC1}$ stands, the program proceeds to a step 210, wherein a third group $T_{ACC3}$ of tables are selected. If the answer is negative or No, that is, if the engine was not in the fuel cut condition and $Ne\leqq N_{ACC1}$ holds, the program proceeds to the step 211, wherein a first group $T_{ACC1}$ of tables are selected.

The reason for selecting different groups $T_{ACCi}$ of tables depending upon the answer of the step 205, i.e. depending upon whether the engine has entered from the fuel cut condition into the accelerating condition, or the engine has entered from a condition other than the fuel cut condition into the accelerating condition, is as follows:

When the engine operates in the fuel cut condition, part of fuel adhering to the inner wall of the intake pipe etc. will evaporate. Consequently, immediately after fuel cut is terminated to resume fuel supply to the engine, if the amount of fuel supplied to the engine is too small to saturate the intake pipe inner wall, the mixture will be substantially leaner. Further, if fuel cut is carried out, there will be substantially no residual $CO_2$ within the engine cylinders so that the amount of air drawn thereinto is correspondingly increased, also causing the air-fuel ratio to become lean. Therefore, in the case where the engine was in the fuel cut condition before entering the accelerating condition, a larger amount of fuel should be supplied to the engine than in the case where the engine was not in the fuel cut condition. To meet the requirement, different groups $T_{ACCi}$ of tables are selected depending whether or not fuel cut was carried out.

On the other hand, the reason for selecting a different groups $T_{ACCi}$ of tables depending upon the engine rotational speed Ne at a step 206 or 209 is that the amount of fuel required by the engine varies depending upon engine operating conditions (i.e. the engine rotational speed Ne) during acceleration of the engine.

The tables of each group $T_{ACCi}$ (i=1, 2, 3, or 4) are selected depending upon the value of the control variable $\eta_{ACC}$ whose value is increased by 1 upon generation of each TDC signal pulse after the engine has entered the accelerating condition. That is, a table $T_{ACCi-0}$ is selected when $\eta_{ACC}=0$, a table $T_{ACCi-1}$ is selected when $\eta_{ACC}=1$, a table $T_{ACCi-2}$ is selected when $\eta_{ACC}=2$, and a table $T_{ACCi-3}$ is selected when $\eta_{ACC}=3$.

Referring again to FIG. 2, after one group $T_{ACCi}$ (i=1, 2, 3, or 4) is selected at the step 207, 208, 210, or 211, the program proceeds to a step 212, wherein one table $T_{ACCi-j}$ (j=0, 1, 2, or 3) is selected depending upon the value of the control variable $\eta_{ACC}$. From the selected table $T_{ACCi-j}$, a correction variable $T_{ACC}$ is read in accordance with the change rate $\Delta\theta_{TH}$ in the throttle valve opening degree $\theta_{TH}$ calculated at the step 201.

If the answer to the question of the step 204 is negative or No, that is, if the value of the control variable $\eta_{ACC}$ is any of 1, 2, or 3, the program proceeds to a step 213, wherein the same group $T_{ACCi}$ that was selected in the last loop is selected, and then the program proceeds to the step 212. That is, at the step 213, the group $T_{ACCi}$, which has been selected at the step 207, 208, 210, or 211 in the first loop ($\eta_{ACC}=0$) immediately after the engine has entered the accelerating condition, is selected again in the present loop, and the program proceeds to the step 212, wherein the first table $T_{ACCi-0}$ is selected to have a correction variable $T_{ACC}$ read therefrom. Thereafter, the second, third, and fourth tables, i.e. $T_{ACCi-1}$, $T_{ACCi-2}$, and $T_{ACCi-3}$ are selected in accordance with increase in the control variable $\eta_{ACC}$ (=1, 2, and 3), to have a correction variable $T_{ACC}$ read therefrom in accordance with the change rate $\Delta\theta_{TH}$, and then the program proceeds to a step 214.

At the step 214, a term $T_{ACC}$ (i.e. $T_{ACC}\times K_2$ in the equation (1)) is calculated, wherein the correction variable $T_{ACC}$ read as above is subjected to limit checking.

Figure 3:
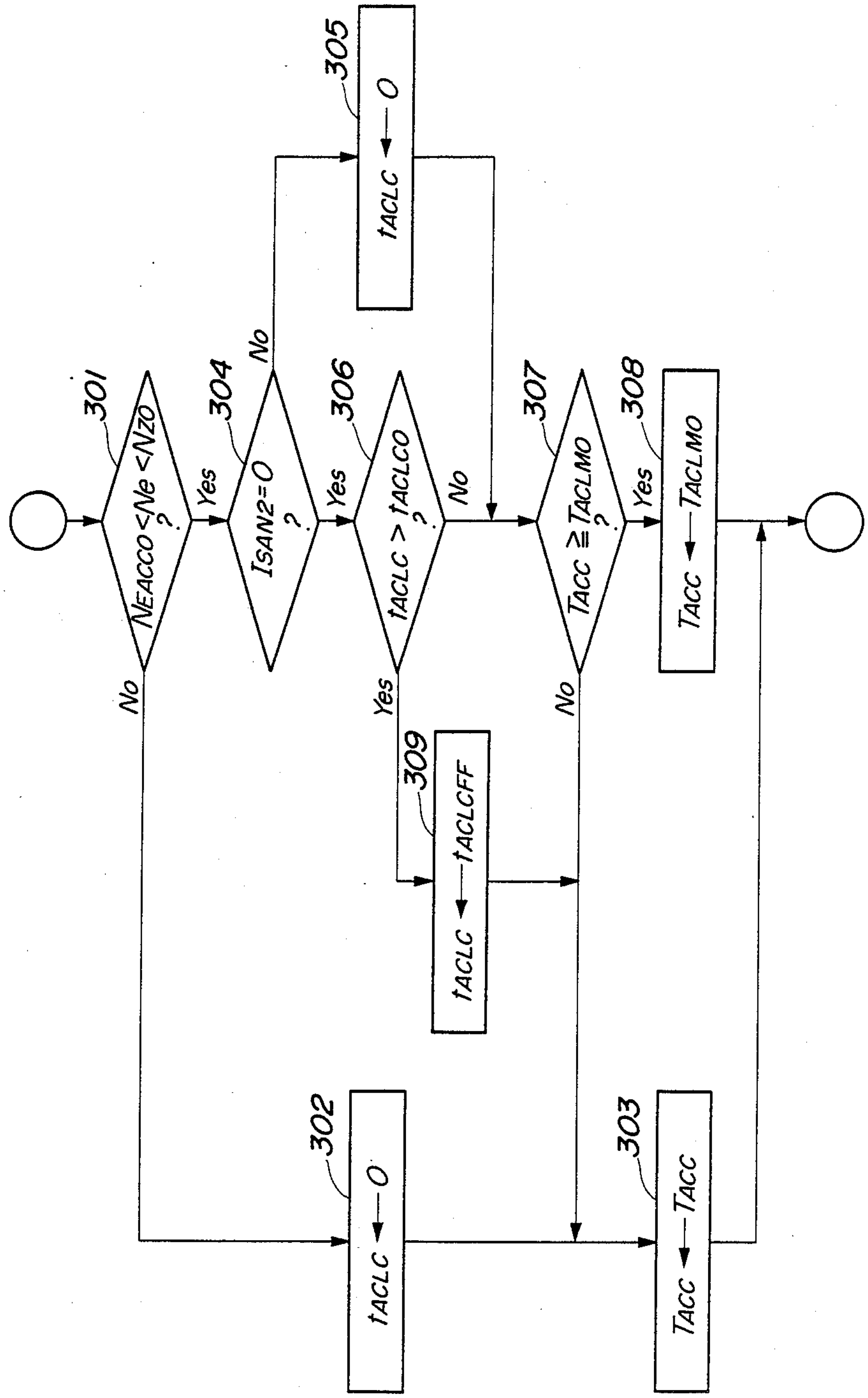
FIG. 3 is a flowchart of a subroutine for carrying out limit checking of the correction variable $T_{ACC}$.

FIG. 3 shows a flowchart of a subroutine for carrying out limit checking of the read correction variable $T_{ACC}$.

Figure 4:
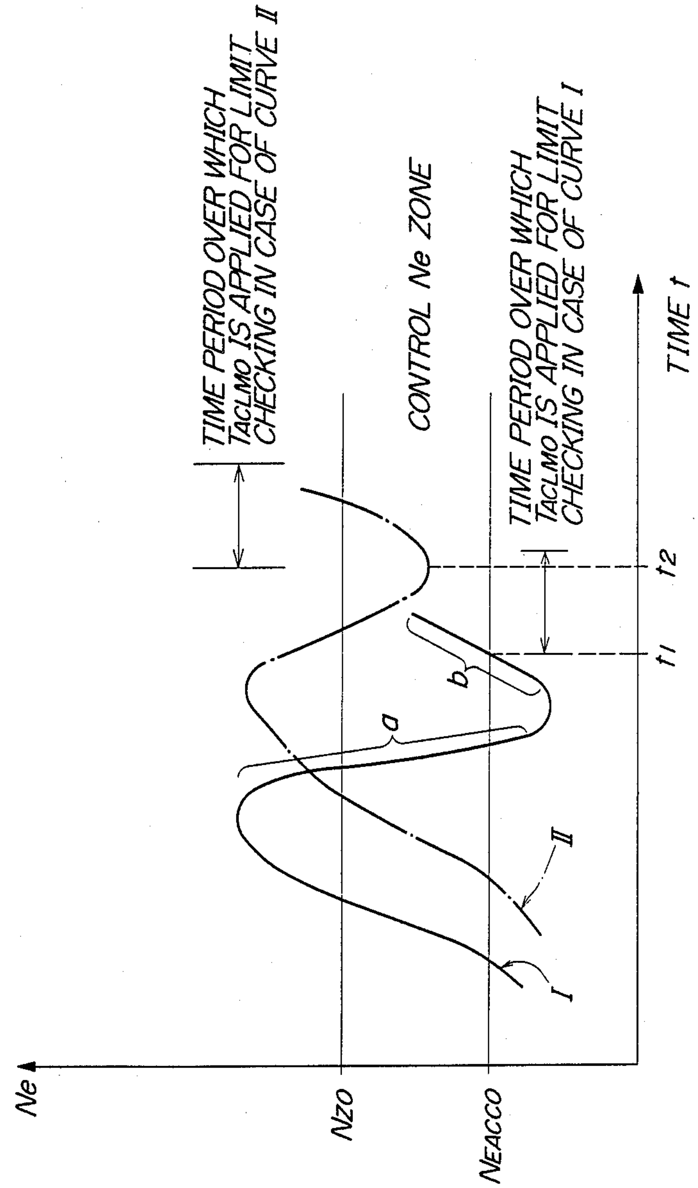
FIG. 4 is a graph useful in explaining the manner of change in the engine rotational speed Ne.

At a step 301, it is first determined whether or not the engine rotational speed Ne falls within a range defined between a first predetermined value $N_{EACC0}$, e.g., 1,500 rpm, and a second predetermined value $N_{Z0}$, e.g. 3,500 rpm, which is higher than the first predetermined value $N_{EACC0}$. The first and second predetermined value $N_{EACC0}$ and $N_{Z0}$ are for setting a control Ne zone defined therebetween, as shown in FIG. 4. If the answer to the question of the step 301 is negative or No, that is, if the engine rotational speed Ne falls out of the control Ne zone, a timer $t_{ACLC}$ has its count value set to 0 for determination at a step 302, hereinafter described. Thus, the timer $t_{ACLC}$ continues to be reset to 0 whenever the step 302 is executed.

At a step 303 following the step 302, the correction variable $T_{ACC}$ is set to a value thereof presently read in accordance with the change rate $\Delta\theta_{TH}$ at the step 212 in the FIG. 2 program, followed by terminating the program.

If the answer to the question of the step 301 is affirmative or Yes, that is, if $N_{EACC0}<Ne<N_{Z0}$ holds, that is the engine rotational speed Ne falls within the control Ne zone, the program proceeds to a step 304, wherein it is determined whether or not the amount of electric current (control current amount) $I_{SAN2}$, which should be supplied to the solenoid 22*b* of the auxiliary air amount control valve 22, is equal to 0. This determination is for discriminating whether or not gear shifting has been done.

Figure 5A:
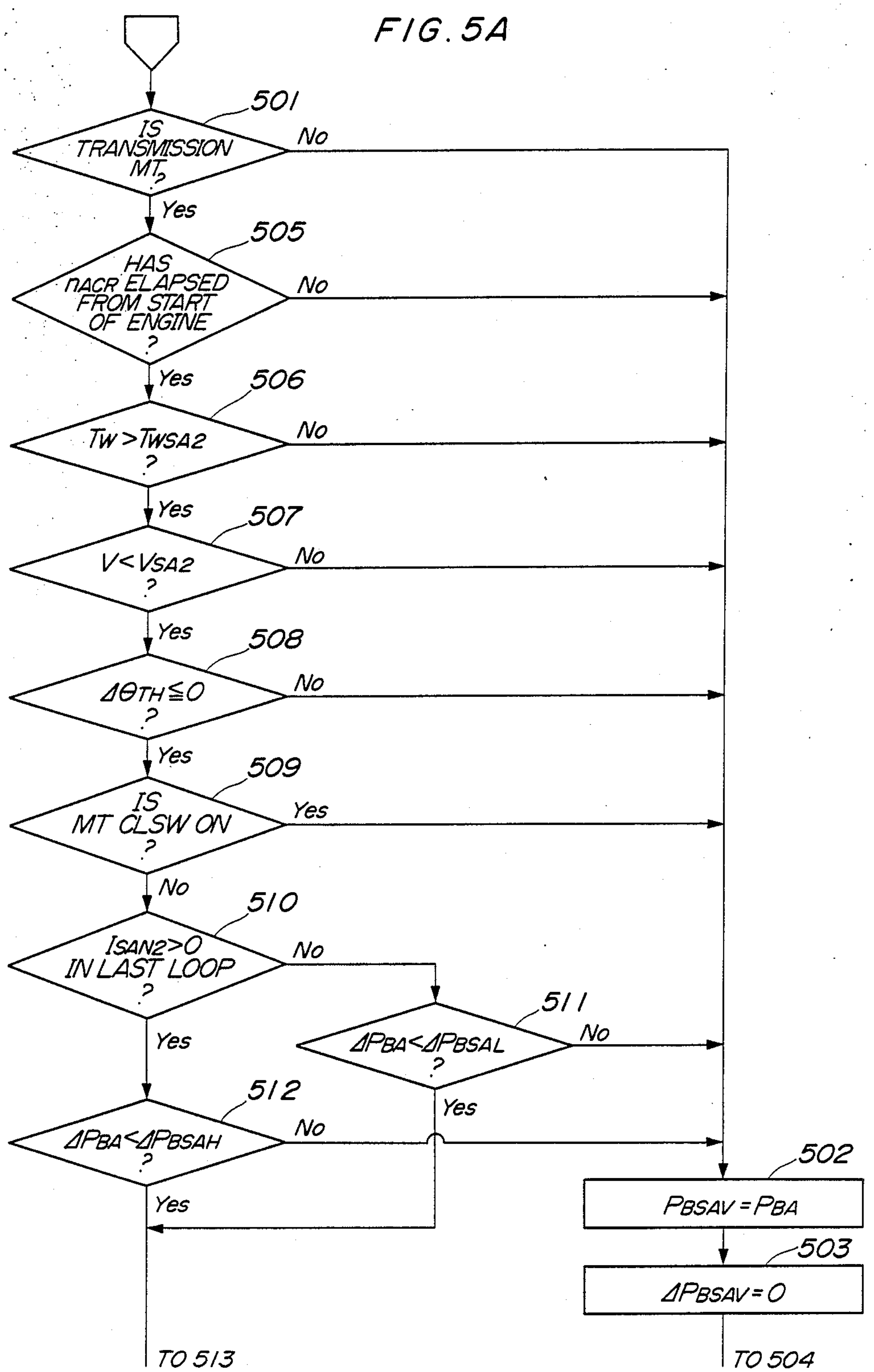
FIG. 5 is a flowchart of a subroutine for determining a control current amount $I_{SAN2}$ applied to the subroutine of FIG. 3.
Figure 6:
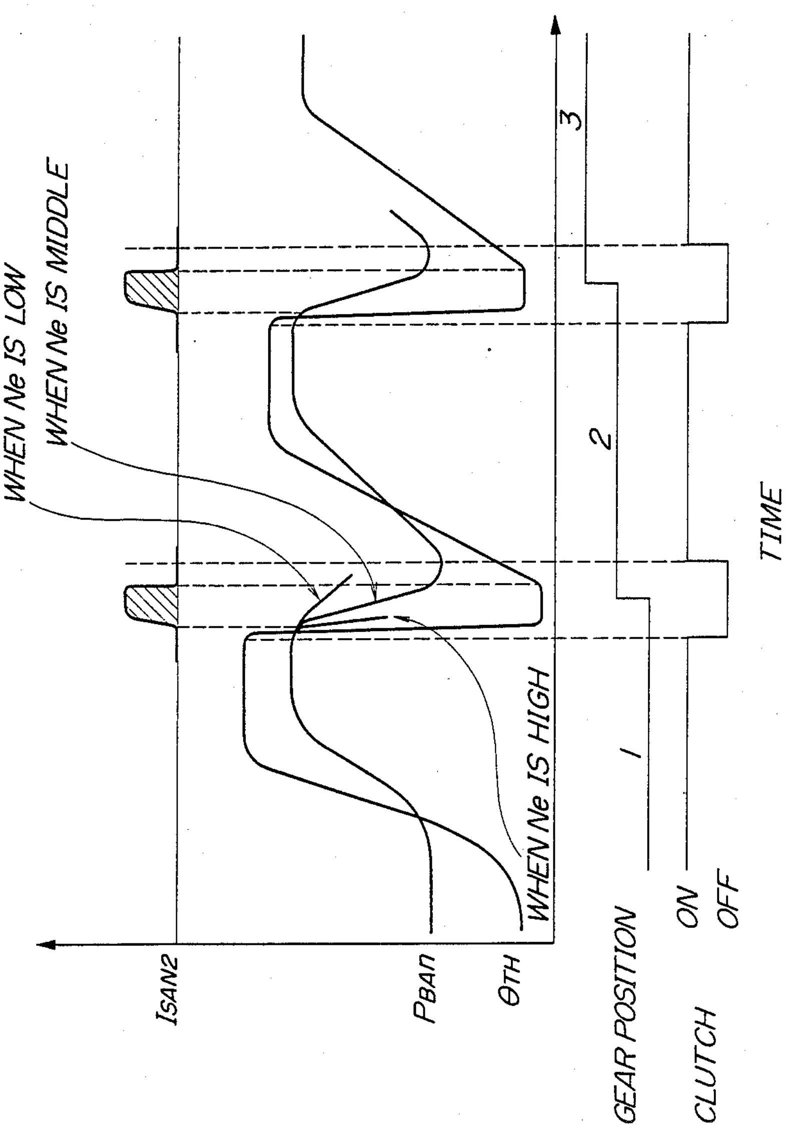
FIG. 6 is a timing chart showing changes in the control current amount $I_{SAN2}$, absolute pressure $P_{BA}$ within the intake pipe, and the opening degree $\theta_{TH}$ of the throttle valve, which are caused by gear shifting and clutch operation, plotted with respect to time.

FIG. 5 shows a program for determining the control current amount $I_{SAN2}$ applied to the step 304 of the FIG. 3 subroutine for controlling the amount of secondary air (shot air), which is executed upon generation of each TDC signal pulse and in sychronism therewith.

First, at a step 501, it is determined whether or not a vehicle in which the engine is installed is equipped with a manual transmission (MT). If the answer is negative or No, a weighted average $P_{BSAV}$, hereinafter referred to, of the intake pipe absolute pressure $P_{BA}$ is set to an actual value of the absolute pressure $P_{BA}$ at a step 502, the difference $\Delta P_{BSAV}$ between the weighted average $P_{BSAV}$ and the actual value $P_{BA}$ is set to 0 at a step 503, and the control current amount $I_{SAN2}$ is set to 0 at a step 504, followed by terminating the program.

On the other hand, if the answer to the question of the step 501 is negative or No, it is judged that the vehicle is equipped with an automatic transmission (AT). In the case of an AT vehicle, engine is still loaded by the AT transmission even during gear shifting, and therefore there is no necessity of effecting control by the present program (shot air supply control), hence rendering the control current amount $I_{SAN2}$ equal to 0 at the step 504.

That is, in the case where an automatic transmission is used, the engine is not brought into a non-loaded state during gear shifting, as distinct from the case where a manual transmission is used, in which case the engine is brought into a non-loaded state by disengagement of the clutch or by closure of the throttle valve by releasing the accelerator pedal. That is, in a vehicle with automatic transmission, gear shifting is automatically carried out in a given manner in accordance with the vehicle speed and the throttle valve opening degree, without the accelerator pedal being released by the driver.

If the answer to the question of the step 501 is affirmative or Yes, that is, if the vehicle is an MT vehicle, the program proceeds to a step 505, wherein it is determined whether or not a predetermined time period $\eta_{ACR}$ has elapsed from starting the engine. If the answer is affirmative or Yes, that is, if the predetermined time period has elapsed after starting the engine was started, the program proceeds to a step 506, wherein it is determined whether or not the engine coolant temperature $T_W$ is higher than a predetermined value $T_{WSA2}$, e.g. 25° C. When the engine coolant temperature $T_W$ is low after the start of the engine, other secondary air (i.e. intake air supplied by a fast idle mechanism) is supplied to the engine so that the intake pipe absolute pressure $P_{BA}$ does not largely decrease, thereby making it unnecessary to effect control by the present program. Therefore, when one of the answers to the questions of the steps 505 and 506 is negative or No, the steps 502 to 504 are executed, followed by terminating the program.

If the answer to the question of the steps 506 is affirmative or Yes, that is, if $T_W > T_{WSA2}$ holds, the program proceeds to a step 507, wherein it is determined whether or not the vehicle speed V is lower than a predetermined value $V_{SA2}$, e.g. 80 km/h. If the answer is negative or No, that is, if $V \geqq V_{SA2}$ holds, the steps 502 to 504 are executed to avoid a sudden increase in the engine rotational speed Ne, followed by terminating the program.

That is, when the engine is accelerated during high speed running of the vehicle, the throttle valve is widely opened. On this occasion, however, if the throttle valve 3 is closed to effect gear shifting, the intake pipe absolute pressure $P_{BA}$ is high just before the closing of the throttle valve so that if the control of the present program is carried out, the engine rotational speed Ne suddenly excessively increases. Therefore, in the present invention, when the vehicle speed V is higher than the predetermined value $V_{SA2}$, the control of the present program is inhibited.

If the answer to the question of the step 507 is affirmative or Yes, that is, if $V < V_{SA2}$ holds, the program proceeds to a step 508, wherein it is determined whether or not the difference $\Delta\theta_{TH}$ between the throttle valve opening degree $\Delta\theta_{THn-1}$ in the last loop and the throttle valve opening degree $\Delta\theta_{THn}$ in the present loop is equal to or smaller than 0, i.e., a negative value. If the answer is affirmative or Yes, that is, if the change rate $\Delta\theta_{TH}$ is equal to or smaller than 0, the program proceeds to a step 509, wherein it is determined whether or not the clutch switch (CLSW) 17 is in an ON position.

The determination at the steps 507 to 509 is for determining whether or not the throttle valve is closed during gear shifting. That is, when the throttle valve is moving in the closing direction or when it is kept fully closed and accordingly the answer to the question of the step 508 is affirmative or Yes, if the clutch is in a disengaged state and accordingly the answer to the question of the step 509 is negative or No, it can be judged that the throttle valve is closed during gear shifting.

If the answer to the question of the step 508 is negative or No, that is, if the change rate $\Delta\theta_{TH}$ exceeds 0 (i.e. positive value), or the answer to the question of the step 509 is affirmative or Yes, that is, if the clutch switch 17 is in the ON position, the aforementioned steps 502 to 504 are executed, followed by terminating the program. This is because the present program is intended to avoid overrichment of the air-fuel ratio (A/F) by supplying shot air to the engine when the throttle valve is closed with the clutch disengaged and at the same time the intake pipe absolute pressure $P_{BA}$ is low.

On the other hand, if the answer to the question of the step 508 is affirmative or Yes, and at the same time the answer to the question of the step 509 is negative or No, the program proceeds to steps 510 et seq.

At the step 510, it is determined whether or not the control current amount $I_{SAN2}$ obtained in the last loop is larger than 0, in order to determine whether or not the control of supplying shot air to the engine has already been carried out. If the answer is negative or No, that is, if the control current amount $I_{SAN2}$ in the last loop is equal to 0 and accordingly no electric current was supplied to the solenoid **22*b* in the last loop, the program proceeds to a step 511**, wherein it is determined whether or not the difference $\Delta P_{BA}$ between the intake pipe absolute pressure $P_{BA}$ in the present loop and that in the last loop is lower than a predetermined value $\Delta P_{BSAL}$, e.g. −21 mmHg, defining a lower limit of the difference $\Delta P_{BA}$ for discriminating whether or not the weighted average $P_{BSAV}$ should be calculated. Incidentally, the difference $\Delta P_{BA}$ can be determined as $\Delta P_{BA} = 80H + - P_{BAn} - P_{BAn-1}$.

If the answer to the question of the step 511 is negative or No, that is, if the difference $\Delta P_{BA}$ exceeds the lower limit $\Delta P_{BSAL}$, the steps 502 to 504 are executed, followed by terminating the program.

On the other hand, if the answer to the question of the step 510 is affirmative or Yes, that is, if the control current amount $I_{SAN2}$ determined in the last loop at a step 517, hereinafter referred to, is applied in the present step to continue the control of the present program, the program proceeds to a step 512, wherein it is determined whether or not the difference $\Delta P_{BA}$ is smaller than a predetermined value $\Delta P_{BSAH}$, e.g. +6 mmHg, defining an upper limit of the difference $\Delta P_{BA}$ for discriminating whether or not the weighted average $P_{BSAV}$ should be calculated. If the answer is negative or No, that is, if the difference $\Delta P_{BA}$ exceeds the upper limit $\Delta P_{BASH}$, the steps 502 to 504 are executed, followed by terminating the program.

If the answer to the question of the step 511 or 512 is affirmative or Yes, that is, if the difference $\Delta P_{BA}$ is below the lower limit value $\Delta P_{BSAL}$ or if the difference $\Delta P_{BA}$ is below the upper limit value $\Delta P_{BSAH}$, the program proceeds to steps 513 et seq for supplying secondary air to the engine. Once the condition for supplying the control current amount $I_{SAN2}$ is satisfied, the supply of the amount $I_{SAN2}$ is continued until the difference $\Delta P_{BA}$ exceeds the upper limit $\Delta P_{BSAH}$ to render the answer of the step 510 affirmative or Yes and the answer of the step 512 negative or No.

At a step 513, the weighted average $P_{BSAV}$ of the intake pipe absolute pressure $P_{BA}$ is determined based on the following equation (2).

$$P_{BSAV} = (C_{SAREF}/256 \times P_{BAn}) + [(256 - - C_{SAREF})/256] \times P_{BSAVn-1} \quad (2)$$

where $C_{SAREF}$ is a variable as an averaging coefficient for calculating $P_{BSAV}$, which is experimentally set at an appropriate value from 1 to 256.

Then, the difference $\Delta P_{BSAV}$ between the weighted average $P_{BSAV}$ determined at the step 513 and the actual value of the intake pipe absolute pressure $P_{BA}$ is determined at a step 514.

Then, the program proceeds to a step 515, wherein it is determined whether or not the difference $\Delta P_{BSAV}$ is larger than a predetermined value $\Delta P_{BSAVG}$, e.g. +5 mmHg, for discriminating whether or not the control current amount $I_{SAN2}$ should be calculated. If the answer is negative or No, that is, if the difference $\Delta P_{BSAV}$ is smaller than the predetermined value $\Delta P_{BSAVG}$the program proceeds to the step 504, wherein the control current amount $I_{SAN2}$ is set to 0, followed by terminating the program.

If the answer to the question of the step 515 is affirmative or Yes, that is, if the difference $\Delta P_{BSAV}$ is larger than the predetermined value $\Delta P_{BSAVG}$, the program proceeds to a step 516, wherein a correction coefficient $K_{SAN2}$ (gain) for calculating the control current amount $I_{SAN2}$ is read in accordance with the engine rotational speed Ne.

The correction coefficient $K_{SAN2}$ is read with respect to three predetermined rotational speed values, i.e., a first predetermined value $N_{SAN21}$ (e.g. 2000/1500 rpm), a second predetermined value $N_{SAN22}$ (e.g. 3000/2500 rpm) ($N_{SAN21}<N_{SAN22}$), and a third predetermined value $N_{Z0}$ ($N_{SAN22}<N_{Z0}$) such that the correction coefficient $K_{SAN2}$ is set to a first predetermined value $K_{SAN20}$ when $Ne<N_{SAN21}$, to a second predetermined value $K_{SAN21}\leqq Ne<N_{SAN22}$, and to a third predetermined value $K_{SAN22}$ when $N_{SAN22}\leqq Ne<N_{Z0}$.

The first to third predetermined values $K_{SAN20}$, $K_{SAN21}$, and $K_{SAN22}$ are set such that $K_{SAN20}$ for a lower Ne range and $K_{SAN22}$ for a higher Ne range are set at relatively smaller values, respectively, and $K_{SAN21}$ for a middle Ne range is set at a relatively larger value.

At a step 517, a value of the correction coefficient $K_{SAN2}$, which has been read in accordance with the engine rotational speed Ne at the step 516, is multiplied by the difference $\Delta P_{SAV}$ obtained at the step 514 to determine a value of the control current amount $I_{SAN2}$, followed by terminating the program.

The reason for setting the correction coefficient $K_{SAN2}$ to different values dependent upon the engine rotational speed Ne (i.e., the correction coefficient $K_{SAN2}$ for lower or higher Ne range is set smaller than $K_{SAN2}$ for middle Ne range) is as follows:

At a low engine rotational speed Ne, when the throttle valve opening degree $\theta_{TH}$ decreases, the intake pipe absolute pressure $P_{BA}$ decreases at a relatively lower decreasing rate so that if secondary air is supplied to the engine on such an occasion, the total intake air amount will be excessively large. On the other hand, at a high engine rotational speed Ne, the intake pipe absolute pressure $P_{BA}$ decreases at a relatively higher decreasing rate to increase the value of the difference $\Delta P_{SAV}$, also resulting in an excessive total intake air amount.

By thus controlling the supply of secondary air, intake air can be supplied to the engine in amounts appropriate to changes in the intake pipe absolute pressure $P_{BA}$ caused by closing of the throttle valve during gear shifting, thereby preventing sudden change in the intake pipe absolute pressure $P_{BA}$ and hence sudden vaporization of fuel adhering to the intake pipe inner wall. Further, even when the throttle valve is closed, secondary air as intake air is supplied to the engine, thereby bringing the air-fuel ratio of the mixture to a proper value.

As described above, in the present embodiment, secondary air is supplied through the air passage 20 to the engine at proper timing during gear shifting based on the control current amount $I_{SAN2}$ set by the FIG. 5 program. With such arrangement, it can be detected by monitoring the value $I_{SAN2}$ whether or not the engine is in the accelerating condition immediately after gear shifting has been done. Specifically, it can be judged that the engine is in the accelerating condition immediately after gear shifting before the lapse of a predetermined time period from the time the control current amount $I_{SAN2}$ becomes 0 (e.g. the value $I_{SAN2}$ assumes 0 when the throttle valve starts to be opened).

Referring again to FIG. 3, the control current amount $I_{SAN2}$ is monitored at the step 304. If the answer is negative or No, that is, if the control current amount $I_{SAN2}$ is not equal to 0 and accordingly shot air supply control is being effected, the program proceeds to a step 305, wherein the timer $t_{ACLC}$ is reset to 0, similarly to the step 302, and then the program proceeds to steps 307 et seq.

If the answer to the question of the step 304 is affirmative or Yes, that is, if $I_{SAN2}=0$ holds, the program proceeds to a step 306, wherein it is determined whether or not the count value of the timer $t_{ACLC}$ exceeds a predetermined value $t_{ACLC0}$, e.g. 2 seconds.

Whenever the step 302 or 305 is executed, the timer $t_{ACLC2}$ is reset to 0, so that a time period elapsed from the reset timing of the timer $t_{ACLC2}$ is monitored at the step 306. Therefore, it can be judged whether or not the predetermined time period has elapsed from the time the engine rotational speed Ne exceeded the predetermined value $N_{EACC0}$ or from the time gear shifting was completed.

FIG. 4 shows examples of simplified manners of detecting the accelerating condition immediately after gear shifting, wherein the solid curve I shows a detecting manner which uses the engine rotational speed Ne to determine the lapse of the above predetermined time period. According to this manner, when the clutch is disengaged for shifting gears, the engine rotational speed Ne suddenly lowers across the control Ne zone defined between the upper and lower limit values $N_{Z0}$, $N_{EACC0}$, as shown by the curve portion a. After completion of gear shifting, the engine rotational speed Ne increases to enter the control Ne zone at a time point $t_1$, as shown by the curve portion b. The lapse of time period from the time point $t_1$ is monitored, as stated above.

The broken curve II shows another detecting manner using the control current amount $I_{SAN2}$, wherein when the clutch is disengaged for gear shifting, the engine rotational speed Ne only decreases to a value above the lower limit value $N_{EACC0}$ of the control Ne zone. After completion of gear shifting, when the engine enters the accelerating condition at a time point $t_2$, at which the control current amount $I_{SAN2}$ becomes 0 with the throttle valve opened. The lapse of time period from the time point $t_2$ can be monitored.

Referring again to FIG. 3, if the answer to the question of the step 306 is negative or No, that is, if $t_{ACLC}\leqq t_{ACLC0}$ holds and accordingly the predetermined time period has not elapsed, the program proceeds to a step 307, wherein it is determined whether or not a value of the correction variable $T_{ACC}$, which has presently been read from the table, is equal to or larger than a first predetermined value $T_{ACLM0}$ defining an upper limit value of the value $T_{ACC}$. The first predetermined value $T_{ACLM0}$ serves to prevent excessive torque from being caused by engagement of the clutch immediately after gear shifting. If the answer to the question of the step 307 is negative or No, that is, if the read value of the correction variable $T_{ACC}$ is not equal to or above the first predetermined value $T_{ACLM0}$, there is no necessity of limiting the read correction variable $T_{ACC}$ so that the program proceeds to the step 303, wherein the read value $T_{ACC}$ is directly applied for accelerating fuel increment correction, followed by terminating the program.

On the other hand, if the answer is affirmative or Yes, that is, if the read value $T_{ACC}$ is equal to or above the first predetermined value $T_{ACLM0}$, it is judged that there is necessity of preventing sudden increase in engine output torque so that the program proceeds to a step 308, wherein the correction variable $T_{ACC}$ is set to the first predetermined value $T_{ACLM0}$, followed by terminating the program.

As described above, in the case of the curve I in FIG. 4, limiting of the correction variable $T_{ACC}$ to the upper limit value $T_{ACLM0}$ is carried out over the time period $t_{ACL0}$ from the time point $t_1$, at which the engine rotational speed Ne enters the control Ne zone, whereas, in the case of the curve II, limiting of the correction variable $T_{ACC}$ to the upper limit value $T_{ACLM0}$ is carried out over the time period $T_{ACL0}$ from the time point $t_2$, at which the control current amount $I_{SAN2}$ becomes 0. Consequently, when the clutch is first disengaged for shifting gears while closing the throttle valve, and the clutch is then engaged while opening the throttle valve after completion of the gear shifting, the fuel supply amount is increased in response to depression of the accelerator pedal, i.e., the rate of change $\Delta\theta_{TH}$ detected at the step 201 in FIG. 2, but the correction variable $T_{ACC}$ is limited to or below the upper limit value $T_{ACLM0}$ within the predetermined time period $t_{ALC0}$ after completion of gear shifting to thereby prevent sudden increase in the engine output torque and hence prevent vibration of the vehicle body, resulting in improved accelerability of the engine.

If the answer to the question of the step 306 then becomes affirmative or Yes, that is, if $t_{ACLC} > t_{ACLC0}$ becomes satisfied (the predetermined time period has elapsed), the program proceeds to a step 309, wherein the count value of the timer $t_{ACLC}$ is set to a predetermined value $t_{ACLCFF}$, which corresponds to FF in sexadecimal digits, for example, and then the program proceeds to the step 303 to execute the same step, followed by terminating the program.

After the limit checking is done by the FIG. 3 program, the step 214 in the FIG. 2 program is executed by applying the value of the correction vatriable $T_{ACC}$ obtained at the step 303 or 308 to the $T_{ACC}$ term ($T_{ACC} \times K_2$) of the equation (1) for calculating the same term. Then the program proceeds to a step 215, wherein the control variable $\eta_{ACC}$ is increased by 1, followed by terminating the program.

If the answer to the question of the step 203 is affirmative or Yes, that is, if 4 TDC signal pulses have been generated after the engine entered the accelerating condition, it is judged that the time period over which the accelerating fuel increment correction is to be carried out has elapsed, and the program jumps to a step 215.

If the answer to the question of the step 202 is negative or No, that is, if $\Delta\theta_{THn} \leqq G+$ holds, the program proceeds to a step 216, wherein it is determined whether or not the change rate $\Delta\theta_{TH}$ in the throttle valve opening degree $\theta_{TH}$ is smaller than a predetermined value $G-$, e.g. $-0.4$ degrees/TDC signal pulse, for discriminating a predetermined decelerating condition.

If the answer to the question of the step 216 is affirmative or Yes, that is, if it is determined that the engine is in the decelerating condition, the program proceeds to a step 217, wherein the correction variable $T_{ACC}$ for acceleration is set to 0, and then the program proceeds to a step 218, wherein the control variable $\eta_{ACC}$ is set to 0, followed by terminating the program.

If the answer to the question of the step 216 is affirmative or Yes, that is, if it cannot be determined whether the engine is in the accelerating condition or in the decelerating condition, the program skips over the step 217 to the step 218.

The valve opening period $T_{OUT}$ of the fuel injection valves 6 is calculated by another program by substituting the $T_{ACC}$ term obtained at the step 214 or 217 of the present program into the equation (1) so that fuel is supplied to the engine in an amount corresponding to the calculated value $T_{OUT}$.

As described above, according to the electronically-controlled fuel injection system of the invention, even when the engine is accelerated while shifting gears into a higher speed position, the accelerating fuel increment correction value is limited to the upper limit value before the lapse of a predetermined time period from the time the gear shifting has been completed. Therefore, sudden increase in the engine output torque can be prevented, and hence the accelerability of the engine can be improved.

What is claimed is:

1. In an electronically-controlled fuel injection system for an internal combustion engine, said system having acceleration determining means for determining whether or not said engine is in an accelerating condition, and accelerating fuel increasing means for increasing an amount of fuel supplied to said engine by means of an incremental value when said acceleration determining means determines that said engine is in said accelerating condition, the improvement comprising:

rotational speed detecting means for detecting whether or not the rotational speed of said engine exceeds a predetermined value while said acceleration determining means determines that said engine is in said accelerating condition;

time period discriminating means for discriminating whether or not a predetermined time period has elapsed from the time said rotational speed detecting means detected that the rotational speed of said engine increased above said predetermined value; and incremental value limiting means for limiting said incremental value to a predetermined upper limit value if the former exceeds the latter before said time period discriminating means discriminates that said predetermined time period has elapsed.

2. In an electronically-controlled fuel injection system for an internal combustion engine having power transmission means, said system having acceleration determining means for determining whether or not said engine is in an accelerating condition, and accelerating fuel increasing means for increasing an amount of fuel supplied to said engine by means of an incremental value when said acceleration determining means determines that said engine is in said accelerating condition, the improvement comprising:

after-shifting discriminating means for discriminating whether or not a predetermined time period has elapsed from the time gear shifting of said power transmission means was completed while said acceleration determining means determines that said engine is in said accelerating condition; and incremental value limiting means for limiting said incremental value to a predetermined upper limit value if the former exceeds the latter before said after-shifting discriminating means discriminates that said predetermined time period has elapsed.

3. A system as claimed in claim 2, wherein said engine has an intake air passage, a throttle valve arranged in said intake air passage, and a clutch forming part of said power transmission means, said gear shifting of said power transmission means is carried out when said throttle valve is in a closed state and said clutch is in a disengaged state.

4. A system as claimed in claim 3, wherein said engine is associated with secondary air supply means for supplying secondary air into said intake air passage at a location downstream of said throttle valve, and control amount determining means for determining a control amount of said secondary air supply means, said control amount determining means setting said control amount to a larger value than zero during said gear shifting, said after-shifting discriminating means discriminating that said gear shifting has been completed when said control amount becomes zero.

5. In an electronically-controlled fuel injection system for an internal combustion engine having acceleration determining means for determining whether or not said engine is in an accelerating condition, and accelerating fuel increasing means for increasing an amount of fuel supplied to said engine by means of an incremental value when said acceleration determining means determines that said engine is in said accelerating condition, the improvement comprising:

rotational speed detecting means for detecting whether or not the rotational speed of said engine exceeds a predetermined value while said acceleration determining means determines that said engine is in said accelerating condition;

time period discriminating means for discriminating whether or not a predetermined time period has elapsed from the time said rotational speed detecting means detected that the rotational speed of said engine increased above said predetermined value; and after-shifting discriminating means for discriminating whether or not said predetermined time period has elapsed from the time gear shifting of said power transmission means was completed while said acceleration determining means determines that said engine is in said accelerating condition; and incremental value limiting means for limiting said incremental value to a predetermined upper limit value if the former exceeds the latter before one of said time period discriminating means and said after-shifting discriminating means discriminates that said predetermined time period has elapsed.

* * * * *